(12) United States Patent
Song et al.

(10) Patent No.: US 7,035,946 B2
(45) Date of Patent: Apr. 25, 2006

(54) METHOD FOR SETTING SYSTEM WORKING FREQUENCY WHEREIN AN ASIC IS UTILIZED FOR MODULATING THROUGH THE VOLTAGE VALUE OF A JUMPER

(75) Inventors: Fei-Wen Song, Hsinchu Hsien (TW); Tien-Wei Lin, Taipei (TW)

(73) Assignee: ASUSTeK Computer Inc., Taipei (TW)

( * ) Notice: Subject to any disclaimer, the term of this patent is extended or adjusted under 35 U.S.C. 154(b) by 274 days.

(21) Appl. No.: 10/647,513

(22) Filed: Aug. 26, 2003

(65) Prior Publication Data
US 2004/0039974 A1    Feb. 26, 2004

(30) Foreign Application Priority Data
Aug. 26, 2002  (TW) ................. 91119294 A

(51) Int. Cl.
*G06F 3/00*     (2006.01)
*G06F 13/00*    (2006.01)
(52) U.S. Cl. ............ 710/10; 710/8; 710/9; 713/1; 713/2; 713/100; 713/300
(58) Field of Classification Search ............ 710/8–10; 713/1, 2, 300, 100
See application file for complete search history.

(56) References Cited

U.S. PATENT DOCUMENTS

| | | | | |
|---|---|---|---|---|
| 5,951,681 A * | 9/1999 | Chang | ........................... | 713/1 |
| 6,148,397 A * | 11/2000 | Chang | ........................... | 713/1 |
| 6,795,927 B1 * | 9/2004 | Altmejd et al. | ............. | 713/300 |
| 6,845,444 B1 * | 1/2005 | Su et al. | ........................ | 713/1 |
| 6,845,456 B1 * | 1/2005 | Menezes et al. | ............. | 713/320 |
| 2002/0178320 A1* | 11/2002 | Wu | ............................. | 710/306 |

FOREIGN PATENT DOCUMENTS

TW    087103986    8/2000

OTHER PUBLICATIONS

Patent Abstracts of Japan, "Computer System," Patent No. JP2001060127, Mar. 6, 2001.

* cited by examiner

*Primary Examiner*—Tammara R. Peyton
(74) *Attorney, Agent, or Firm*—Birch Stewart Kolasch & Birch LLP

(57) ABSTRACT

A method for setting system working frequency includes the steps of: executing assert reset; modulating the system working frequency according to set values of BIOS through a jumper-free IC; deasserting reset and starting CPU; and proceeding and completing subsequent initialization process.

6 Claims, 2 Drawing Sheets

METHOD FOR SETTING SYSTEM WORKING FREQUENCY WHEREIN AN ASIC IS UTILIZED FOR MODULATING THROUGH THE VOLTAGE VALUE OF A JUMPER

This Nonprovisional application claims priority under 35 U.S.C. §119(a) on Patent application Ser. No(s). 91119294 filed in TAIWAN, R.O.C. on Aug. 26, 2002, the entire contents of which are hereby incorporated by reference.

FIELD OF THE INVENTION

The present invention relates to a method for setting system working frequency and particularly a method for setting system working frequency in a computer reset condition.

BACKGROUND OF THE INVENTION

The rapid development of information industry and wide applications of computers have made the computer an essential electric appliance in general households. However, computer equipment generally have very short product life cycle. New products are constantly introduced. To match computer system upgrade, users often have to replace a portion of the equipment.

Take computer CPU for instance. Most large CPU manufacturers in the world today, such as Intel and AMD, have different working frequencies for their CPU products. Even CPUs of the same type may have different working frequencies. In addition, memories also have different working frequencies. In order to improve system operation effectiveness and flexibility, or to match the working pulse of the elements on the mainboard, these days most computers provide a functional design that enables users to set system working frequency.

Referring to FIG. 1 for a process flow of setting system working frequency adopted in conventional techniques. The process steps include: turning on power supply (10); executing computer reset and asserting reset (11); deasserting reset and starting CPU (12); determining whether the system working frequency matching the system working frequency set by BIOS (13); if the system working frequencies do not match, executing modulation programs of clock chip by CPU and adjusting the system working frequency to match the value of BIOS (14), then returning to step 11; if the system working frequencies match, proceeding and completing the subsequent initialization process (15).

In the process flow set forth above, when the computer asserts reset, the chipset, CPU and peripheral devices enter in an initialization state, then deassert reset is performed. Meanwhile the system proceeds operations according to the initialized working frequency of the clock chip. In general, the initialized working frequency of the clock chip is preset when the computer was shipped from the plant. If the initialized working frequency is different from what users have set, the working frequency of the clock chip is modulated by BIOS for matching the frequency set by the users. Then the system must be reset again so that it is able to operate according to the frequency set by the users, and to complete the subsequent system initialization process.

The biggest disadvantage of the conventional techniques is that if the working frequency set by users is different from the initialization, the computer must be reset twice before completing the setting of system working frequency. As a result, initialization time is longer. It also may cause dysfunction of the chipset or elements on the computer mainboard, or even result in system down. Hence to improve the method of setting system working frequency has become an important issue to computer system developers. The goal is to streamline the setting process of system working frequency.

SUMMARY OF THE INVENTION

The primary object of the invention is to provide a method for setting system working frequency that does not need extra assert reset during computer initialization, so that computer initialization time is reduced and dysfunction of the chipset or elements caused by repeated assert reset may be avoided.

The method for setting system working frequency according to the invention includes the steps of: first, asserting reset; modulating system working frequency according to the set value of BIOS by means of a jumper-free IC; closing the reset and starting the CPU; finally proceeding and completing subsequent initialization process.

The biggest difference between the invention and the conventional techniques is that conventional techniques have to start the CPU after assert reset, and to modulate the system working frequency when having discovered the system working frequency did not match the set value of BIOS, then restart another assert reset to proceed the subsequent initialization process. The invention employs a jumper-free IC to modulate the system working frequency according to the set value of BIOS while the computer is in the condition of processing reset. The CPU is started after deassert reset has been completed. Then subsequent initialization process is performed.

Because the invention employs a jumper-free IC to set the system working frequency during the asset reset process is underway, and the CPU is started after the deassert reset has been finished, the whole initialization process requires assert reset only once to complete setting of the system working frequency. Thus computer initialization time can be reduced, and dysfunction of the chipset or elements caused by too many executions of assert reset may be avoided.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings, which are given by way of illustration only, and thus are not limitative of the present invention, and wherein.

DETAILED DESCRIPTION OF THE INVENTION

The method for setting system working frequency of the invention aims at using a jumper-free IC to set system working frequency during executing the computer assert reset process and starting the CPU according to the set value after the computer has finished deassert reset. Details of the method will be elaborated below accompanying the preferred embodiment and related drawings.

Figure 1:
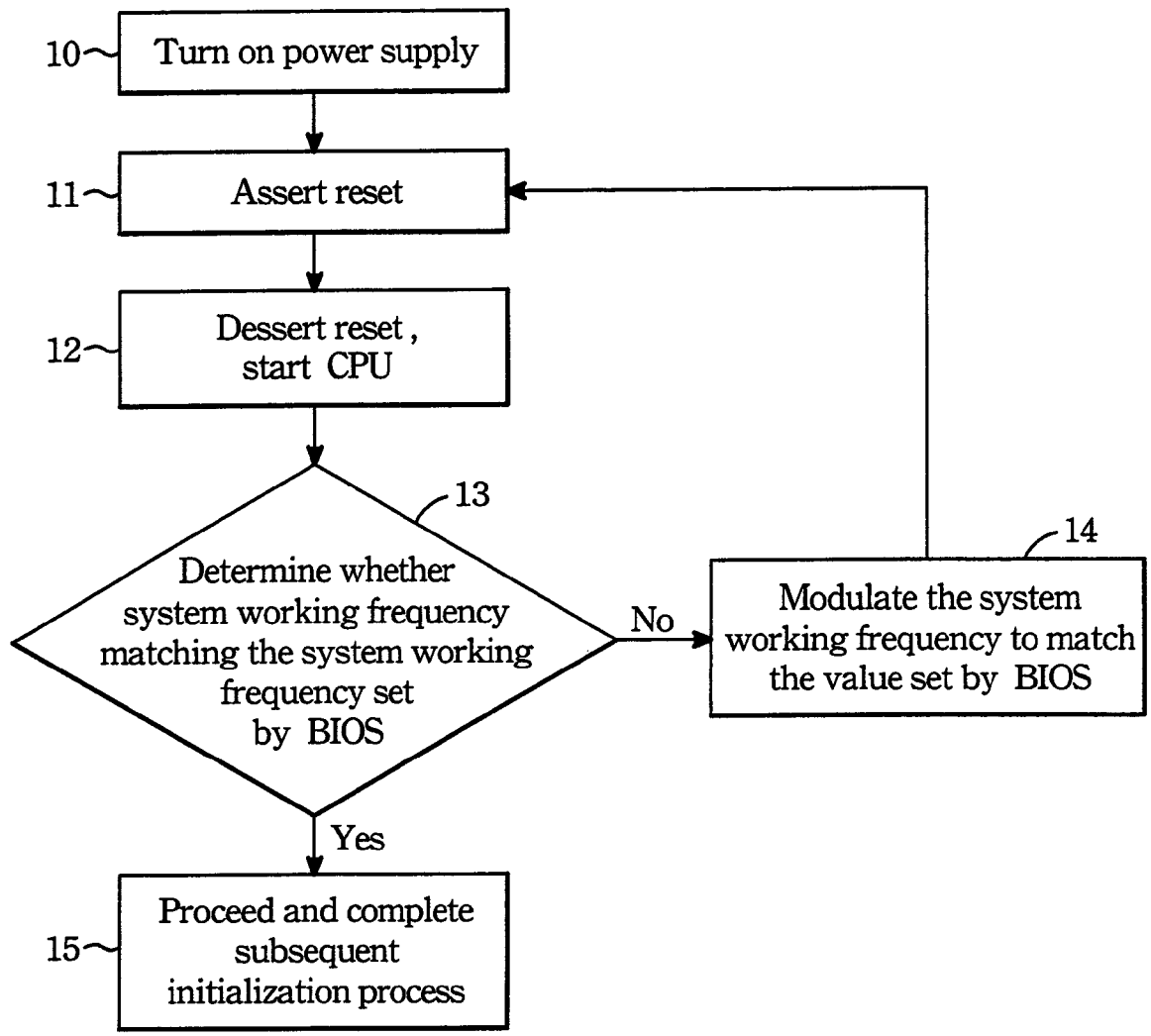
FIG. 1 is a process flow of setting system working frequency of conventional techniques.
Figure 2:
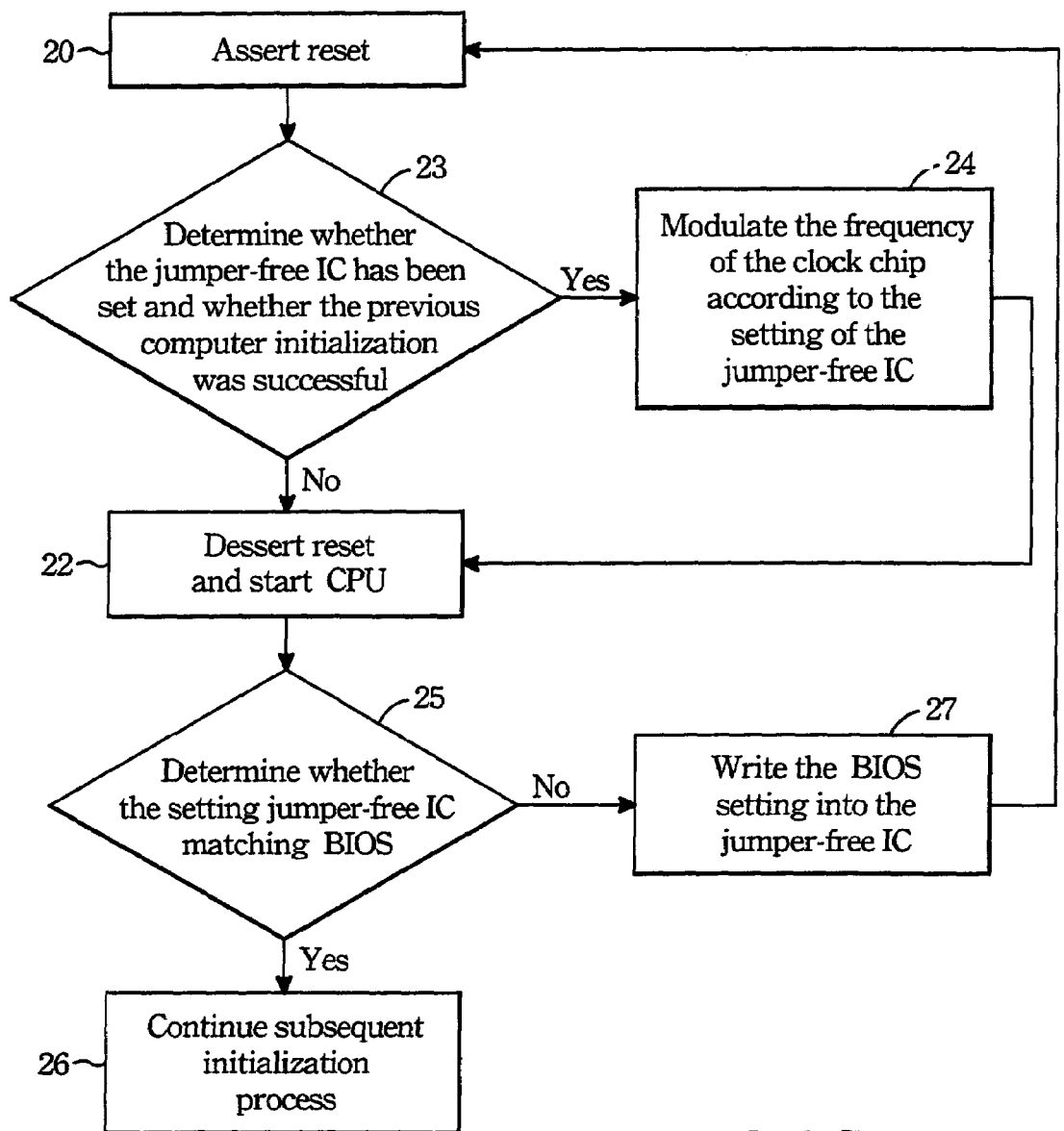
FIG. 2 is a process flow of setting system working frequency of the invention.

Refer to FIG. 2 for the process flow of the method of the invention. It includes the steps of: first, executing computer reset and assert rest (20); determining whether the jumper-free IC has been set and whether the previous computer initialization was successful (23); if the jumper-free IC has been set, modulating system working frequency according to the set value (24), then proceeding deassert reset and starting the CPU (22); otherwise, if there was no setting or the previous computer initialization failed, directly going to step (22); determining whether the jumper-free IC internal setting matching the system working frequency set by BIOS (25); if the settings are matched, continuing subsequent initialization process until finished (26), otherwise, writing the CPU working frequency set by BIOS into the jumper-free IC (27), then going to step 20 and executing assert reset again.

The biggest difference between the invention and the conventional techniques is that the invention modulates the system working frequency while the computer is in assert reset. In addition, the invention includes a jumper-free IC to meet the requirement of modulating the system working frequency. The jumper-free IC is an application specific integrated circuit (ASIC) to directly change the system working frequency by controlling the voltage of the jumper. When an user enters the set menu of BIOS and has completed the setting of the system working frequency, the set values are written simultaneously into the jumper-free IC. And during the assert reset process, the system working frequency is modulated. Thus after the assert reset at step 20 is started to execute, the jumper-free IC determines whether to use the set values written previously to set the system frequency based on whether the previous initialization was successful to avoid the frequency being set too high and result in initialization failure.

As the invention employs the jumper-free IC to set the system working frequency while the computer is assert reset, and after the deassert reset is completed, the CPU is started based on the working frequency that was newly set, the computer requires assert reset only once during initialization to complete the setting of system working frequency. It saves computer initialization time, and also can prevent dysfunction of the chipset or elements on the mainboard that might otherwise occur due to too many assert reset during computer initialization process.

While the preferred embodiment of the invention has been set forth for the purpose of disclosure, modifications of the disclosed embodiment of the invention as well as other embodiments thereof may occur to those skilled in the art. Accordingly, the appended claims are intended to cover all embodiments which do not depart from the spirit and scope of the invention.

What is claimed is:

1. A method for setting system working frequency, comprising the steps of:
   a. executing computer reset and asserting reset;
   b. determining whether setting of a jumper-free IC has been made and whether previous computer initialization was successful, wherein the jumper-free IC is an application specific integrated circuit (ASIC) for modulating the system working frequency through controlling the voltage value of a jumper; and, if the outcome is positive, modulating the system working frequency according to set values of BIOS through the jumper-free IC; and, if the outcome is negative, proceeding to the next step;
   c. deasserting reset and starting CPU; and
   d. proceeding and completing a subsequent initialization process.

2. The method of claim 1, wherein, after step c is completed, determining whether the setting of the jumper-free IC matches the setting of the BIOS; and, if the settings do not match, writing the BIOS setting into the jumper-free IC and branching to step a to perform execution of the assert reset one more time; and, if the settings match, proceeding to step d.

3. A method for setting system working frequency, comprising the steps of:
   a. executing computer reset and asserting reset;
   b. determining whether setting of a jumper-free IC has been made, wherein the jumper-free IC is an application specific integrated circuit (ASIC) for modulating the system working frequency through controlling the voltage value of a jumper; and if the outcome is positive, modulating the system working frequency according to set values of BIOS through the jumper-free IC; and, if the outcome is negative, proceeding to the next step;
   c. deasserting reset and starting CPU; and
   d. proceeding and completing a subsequent initialization process.

4. The method of claim 3, wherein, after step c is completed, determining whether the setting of the jumper-free IC matches the setting of the BIOS; and, if the settings do not match, writing the BIOS setting into the jumper-free IC and branching to step a to perform execution of the assert reset one more time; and if the settings match, proceeding to step d.

5. A method for setting system working frequency, comprising steps of:
   a. executing computer reset and asserting reset;
   b. determining whether previous computer initialization was successful, wherein the jumper-free IC is an application specific integrated circuit (ASIC) for modulating the system working frequency through controlling the voltage value of a jumper; and, if the outcome is positive, modulating the system working frequency according to set values of BIOS through the jumper-free IC; and, if the outcome is negative, proceeding to the next step;
   c. deasserting reset and starting CPU; and
   d. proceeding and completing a subsequent initialization process.

6. The method of claim 5, wherein, after step c is completed, determining whether the setting of the jumper-free IC matches the setting of the BIOS; and, if the settings do not match, writing the BIOS setting into the jumper-free IC and branching to step a to perform execution of the assert reset one more time; and, if the settings match, proceeding to step d.

* * * * *